United States Patent Office 2,931,770
Patented Apr. 5, 1960

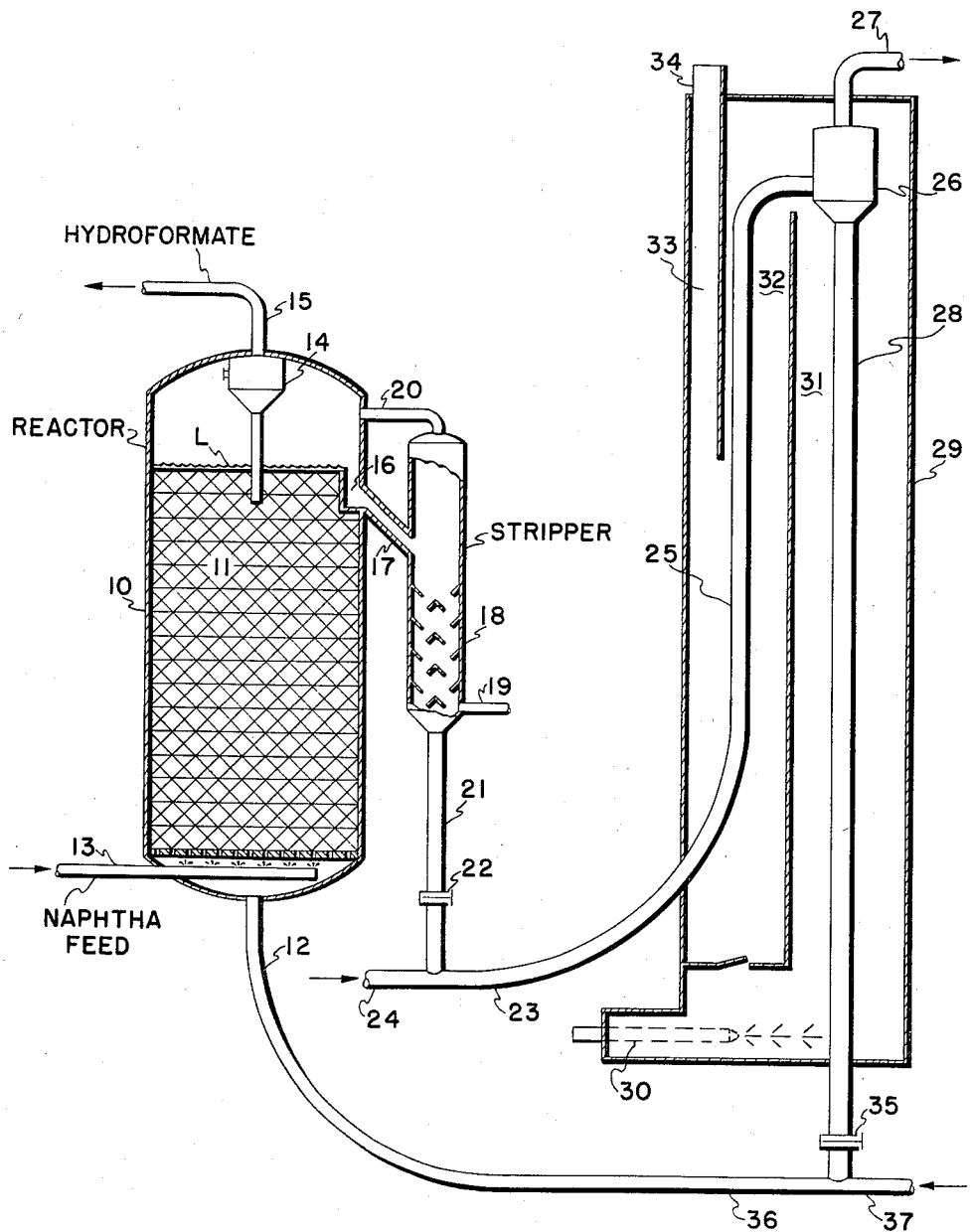

2,931,770

HYDROFORMING PROCESS WITH A FIXED BED OF PLATINUM CATALYST AND FLUIDIZED INERT SOLIDS

Charles Newton Kimberlin, Jr., Baton Rouge, La., assignor to Esso Research and Engineering Company, a corporation of Delaware Application December 2, 1955, Serial No. 550,582

14 Claims. (Cl. 208—138)

The present invention pertains to the hydroforming of hydrocarbon fractions boiling in the motor gasoline range and particularly to an improved method for hydroforming such fractions in contact with platinum-containing catalysts.

Hydroforming may be defined as a process in which a petroleum naphtha is contacted at elevated temperatures and pressures and in the presence of hydrogen or recycled hydrogen-rich process gas with a solid catalytic material under conditions such that there is no net consumption of hydrogen. Hydroforming processes involving the use of group VI metal oxides such as molybdenum oxide as well as of platinum-containing catalysts are well known. Hydroforming with molybdenum oxide catalysts is generally carried out by the fluidized solids technique since this process offers the advantages of continuity of operation, uniformity of temperatures in the reaction as well as the regeneration zones and the facility with which control of all phases of the process is achieved. An important advantage of the fluidized solids process is the fact that the finely divided solid catalyst particles can be used to carry heat released in the regeneration zone into the reaction zone thereby supplying a substantial part of the heat required for hydroforming.

Attempts to develop a suitable fluid hydroforming process using a platinum-containing catalyst have not been very successful for several reasons. In the first place, the most active catalysts developed have been those in which the platinum is deposited upon the alcoholate alumina, particularly upon eta alumina prepared by hydrolysis of aluminum alcoholate. These catalysts have not been satisfactory for fluidized solids operation because of their softness or lack of attrition resistance. This not only leads to difficulties in fluidization because of loss or lack of control of particle size but also to serious economics problems because of the loss of platinum in the catalyst fines passing through the ordinary solids recovery equipment. It is necessary, therefore, in the ordinary platinum hydroforming operations to maintain the catalyst as a fixed bed in the reactor vessel and to supply the heat required for the hydroforming process by preheating the feed well above reactor temperature and also by circulating excessively large amounts of hydrogen rich recycle gas which is also preheated to excessively high temperatures.

It is the object of this invention to provide the art with a novel method of carrying out the hydroforming of naphtha fractions in contact with platinum catalysts or other noble metal catalysts such as palladium catalysts.

It is also the object of this invention to provide an improved method for supplying heat of reaction of a hydroforming reaction zone charged with a platinum hydroforming catalyst.

It is a further object of this invention to provide a platinum hydroforming process employing a fixed bed of catalyst but having many of the advantages of a fluidized solids process.

These and other objects will appear more clearly from the detailed specification and claims which follow.

In accordance with the present invention platinum group metal hydroforming catalyst is arranged in the form of Raschig rings, Berl saddles, large massive lumps or similar forms which will provide a fixed body of catalyst with a labyrinth of passageways in which a fluidized body of finely divided solid heat carrier particles can be maintained and which will permit the mass passage or flow of said finely divided particles in any direction through said fixed body of catalyst.

Heat is provided for the process by withdrawing finely divided solids from the reactor vessel and heating the withdrawn particles by direct or preferably by indirect heat exchange and returning the heated solids to the reactor vessel. They may be reintroduced into the reaction zone with the recycle gas or feed naphtha at essentially the bottom of the reactor vessel or they may be introduced at different levels in the reactor in order to maintain any desired temperature profile in the reactor. A preferred method of operation, that may be carried out with considerable ease in accordance with the present invention, is to establish an inverse temperature gradient by introducing preheated feed and recycle gas to the bottom and the heated finely divided solids to the top of the reactor. Then by withdrawing solids from the bottom of the reactor vessel and thus making them pass essentially countercurrently to the reactants it is possible to establish a higher average temperature level at the top or in the region where the reaction products leave the reaction zone.

Reference is made to the accompanying drawing illustrating diagrammatically a flow plan in accordance with the present invention.

In the drawing 10 is the hydroforming reactor vessel which is charged with large, non-fluidizable pieces of catalyst in the form of Raschig rings, Berl saddles, hollow tubes, cylindrical pieces or the like forming a fixed bed 11. The particular form of the pieces of catalyst is immaterial so long as passageways exist between the pieces so that finely divided solids may be fluidized therein and be caused to flow through the fixed bed of catalyst. For example, catalyst for charging to the reactor may be prepared by impregnating porous porcelain Raschig rings of say 1 to 2 inches in size with alumina hydrosol, preferably prepared by adding glacial acetic acid to an aluminum alcoholate such as aluminum amylate and hydrolyzing with a suitable aqueous liquid. Platinum in amounts of from about 0.05 to 2.0 wt. percent based upon the alumina is then deposited upon the alumina which may be dried and activated before or preferably after the platinum is deposited thereon. Other ways of incorporating platinum or other platinum group metal and alumina on the supporting or packing members will readily occur to those skilled in this art.

A major proportion of the heat required for the process and the temperature in the reaction zone is controlled by circulating through the fixed bed of catalyst, finely divided solids which have been heated in a separate heating vessel by any desired means. The finely divided solid heat carrier, which is between 200 and 400 mesh for easy fluidization, is preferably alumina although it may comprise other materials such as halogen treated alumina, clay, cracking catalyst or mixtures of these or other like solids. Particularly suitable is mullite, a silica-alumina composition which is inert in the hydroforming reaction.

The heat carrier solids are fluidized in the interstices between the catalyst bodies forming a dense bed substantially coextensive with the catalyst bed and having a definite level L. In the embodiment shown, the finely divided solid heat carrier particles are supplied to the bottom of the reactor vessel in the recycle gas stream through inlet line 12 and naphtha feed is supplied through inlet line 13 to suitable distributor means such as rings or spiders at the bottom of the reactor. A perforated distributor plate or grid may advantageously be arranged at the bottom of the reactor to support the catalyst bed and to assist in evening out the distribution of the reactants to the catalyst bed. Reaction products pass overhead from the catalyst bed through cyclone separator 14 which separates entrained heat carrier particles from the product which passes through outlet line 15 to suitable stabilizing or other finishing equipment and then to storage.

The finely divided heat carrier particles overflow into withdrawal well 16 and pass through connecting line 17 into stripper 18. Stripping gas such as recycle gas, steam, methane or even nitrogen or scrubbed flue gas is supplied through inlet line 19 in order to strip entrained product vapors from the heat carrier particles. Disc and donut baffles or the like can be arranged in order to improve contact between the stripping gas and the heat carrier particles. The stripping gas passes overhead from the stripper through outlet line 20 and into the top of the reactor for recovery with the main body of reaction product vapors. In the event that nitrogen or a similar non-condensible inert gas is used for stripping it may be desirable to avoid mixing the stripping gas with the main body of reaction products since it will tend to accumulate in the recycle gas and dilute or lower its hydrogen concentration.

The stripped heat carrier particles are discharged from the stripper 18 into standpipe 21 and thence through slide valve or other suitable flow control means 22 into transfer line 23. A carrier or lift gas is supplied through inlet line 24 in order to convey the heat carrier particles to the heater zone. Any available gas such as tail gas from the process, flue gas or the like will serve to carry the heat carrier particles through transfer line 23 and dilute phase riser 25 into separator 26 where the solids are separated from the carrier gas. The carrier gas is discharged from the separator 26 through outlet line 27 while the heat carrier particles are discharged from separator 26 into standpipe 28 wherein fluistatic pressure to facilitate their transfer back into the reactor vessel 10 is built up.

Heat is supplied to the heat carrier particles in any desired way. In the embodiment shown, the dilute phase riser 25, separator 26 and standpipe 28 are enclosed in a casing 29 in which a burner 30 is arranged to supply heat. The burner is so arranged and the casing is equipped with suitable baffles so that the maximum temperature is attained near the base of standpipe 28, as by arranging the burner in such a manner that the lower part of the standpipe is in a radiant heating section while the flue gases are caused to pass upwardly through passageway 31 in the casing countercurrent to the solids descending through standpipe 28 around the separator, then downwardly in passageway 32 around the upper part of the dilute phase riser and finally upwardly through passageway 33 to stack 34. Baffles can be arranged to improve contact of the hot gases with the conduits and fins can be provided on the interior and/or exterior to the conduits in order to improve heat transfer. If desired, heating of the heat carrier solids can be effected by direct firing of the solids although this involves additional problems of operation of a high pressure burner or of depressuring and repressuring the solids and of stripping residual combustion products from the heat carrier solids. The heated solids, at temperatures of from about 1100–1200° F. are discharged through slide valve 35 or other suitable flow control means into transfer line 36 where they are picked up by a stream of recycle gas supplied through line 37 and carried to inlet line 12 and thence into the bottom of the reactor vessel.

The arrangement shown is for a conventional concurrent flow reactor operation wherein maximum temperature is at the inlet end and minimum temperatures will prevail at the exit end of the reactor bed. Other temperature patterns can be readily obtained by simply altering the inlet point for the heat carrier particles. For example, the reactor can be made substantially isothermal by supplying the heat carrier solids at several vertically spaced points in the catalyst bed within the reactor. Alternatively an inverse temperature gradient can be established by supplying the hot heat carrier materials to the top of the catalyst bed and withdrawing the cooled heat carrier from the bottom of the reactor. The heat carrier particles can be conveyed into the reactor by a feed stream, preferably the recycle gas or they may be introduced separately as by a direct discharge from a standpipe into the catalyst bed at any desired level or levels.

The feed or charging stock to the reactor 10 may be a virgin naphtha, a thermally or catalytically-cracked naphtha or a Fischer-Tropsch naphtha or the like or mixtures of two or more of these naphthas having a boiling range of from about 125–450° F., or it may be a narrow boiling cut from within this range. The feed stock is ordinarily heated to about reaction temperature prior to introduction thereof into the reaction zone. Recycle gas may be preheated to temperatures of up to about 1150–1200° F. and introduced or circulated through the reaction zone at rates of from about 500 to 6000 cu. ft. per barrel of naphtha feed. In view of the fact that heat carrier particles supply a substantial part of the heat requirements of the process, the amount of recycle gas can be held to the minimum necessary for control of carbon formation in the reaction zone.

The hydroforming reaction zone is operated at about 800 to 1000° F., preferably at about 900 to 950° F. and at pressures of about 50 to 1000, preferably at about 200 to 500 lbs. per square inch. If the hydroforming is conducted at pressures below about 400 lbs. per square inch it may be necessary to regenerate the catalyst at infrequent intervals. This can be readily accomplished by shutting off the feed and recycle gas and supplying oxygen-containing regeneration gas, preferably diluted air. This can be carried out advantageously in accordance with this invention by cutting off the burner 30 while continuing the circulation of the heat carrier particles so that they may serve to carry the heat away from the catalyst bed during regeneration. When carbon has been completely or substantially completely removed from the catalyst it may desirably be given a treatment at about 1050–1150° F. with undiluted air and also a brief treatment with halogen-containing gas such as chlorine if the catalyst has lost chlorine during the hydroforming reaction or the regeneration.

The space velocity or the weight in pounds of feed charged per hour per pound of catalyst in the reactor depends upon the age and activity level of the catalyst, the character of the feed and desired octane number of the product and may vary from about 1 to about 6 w./hr./w.

The finely divided heat carrier particles are circulated through the reactor vessel at varying rates depending upon the heat requirements of the particular hydroforming process and the temperature differential between the reaction zone and the heater zone. Ordinarily the heat carrier particles are charged to the reactor vessel at a rate of from about 3 to about 10 parts by weight per part by weight of naphtha feed.

The invention will be illustrated by the following specific example. A catalyst is prepared as follows: An alumina hydrosol is produced according to the method of U.S. Patent 2,656,321. To this end glacial acetic acid is added to a solution of aluminum amylate in excess amyl alcohol and petroleum naphtha and the mixture is hydrolyzed with sufficient water at about 200° F. to give a concentration of about 3 wt. percent $Al_2O_3$ in the aqueous phase. The amount of glacial acetic acid employed is about 0.2 mol per equivalent mol of $Al_2O_3$ in the aluminum amylate solution. Porous clay Raschig rings having dimensions of about 1 inch O.D. x 1 inch length are impregnated with aluminum by soaking in the alumina hydrosol, drying at about 250° F., re-soaking in alumina hydrosol, and finally drying at about 250° F. and calcining for about 4 hours at 1100° F. The calcined Raschig rings containing alumina are impregnated with platinum by treating with a chloroplatinic acid solution containing sufficient platinum to deposit about 0.6 wt. percent of the metal on the alumina. All of the chloroplatinic is adsorbed from the solution onto the alumina. Finally, the catalyst supported on Raschig rings is dried, activated by calcining for about 4 hours at 900° F. and charged to reactor vessel 10.

Microspherical alumina heat carrier particles are produced by spray drying alumina hydrosol. The heat carrier alumina is deactivated by calcining for about 6 hours at 1500° F. before charging to the reaction system.

Referring now to the drawing, a virgin naphtha from South Louisiana crudes having a gravity of about 54.5° API, a boiling range of about 208° to 375° F. and a Research clear octane number of about 56.2 is preheated to 950° F. and introduced into the bottom of reactor vessel 10 by line 13. Recycle gas preheated to 1050° F. and heat carrier solids heated in standpipe 31 to 1050° F. are passed by line 12 into the bottom of vessel 10. The amount of recycle gas employed is 5000 standard cubic feet per barrel of naphtha feed and the amount of heat carrier solids is 1200 pounds per barrel of naphtha feed. The pressure in vessel 10 is maintained at 200 pounds per square inch. As the mixture of naphtha feed, recycle gas, and heat carrier solids pass upwardly through catalyst bed 11, heat is abstracted by the hydroforming reaction so that the temperature in the upper portion of the bed is 900° F. Heat carrier solid overflows into well 16 to stripper 18 whence it is passed by lines 21 and 23 to re-heating zones 25 and 31 and is finally recirculated to reaction zone 11 by lines 36 and 12. Vapors and gases from hydroforming zone 11 pass overhead through line 15 to recovery equipment where the liquid product is condensed and stabilized and whence a portion of the gaseous product is recirculated to line 37. When operating as above described with a feed rate of 4 pounds of naphtha feed per hour per pound of platinum-alumina catalyst (deposited on Raschig rings) in zone 11, there is obtained a yield of 85 vol. percent of $C_{5+}$ hydroformed naphtha having a Research clear octane number of 95.

The foregoing description contains a limited number of embodiments of the present invention. It will be understood that this invention is not limited thereto since numerous variations are possible without departing from the scope of this invention.

What is claimed is:

1. A method of hydroforming petroleum fractions boiling within the motor gasoline boiling range by passing said petroleum fractions in preheated or vaporized condition in admixture with hydrogen-rich recycle gas through a fixed bed of platinum group metal-containing catalyst at active hydroforming conditions of temperature and pressure, in which the improvement comprises maintaining a dense, fluidized bed of heat transfer particles in contact with said fixed bed of catalyst, continuously withdrawing heat transfer particles from said fluid bed, heating the withdrawn particles in a separate heating zone and recycling the heated heat carrier particles to the dense fluid bed of heat carrier particles in contact with said fixed bed of catalyst.

2. A method of hydroforming petroleum fractions boiling within the motor gasoline boiling range by passing said petroleum fractions in preheated condition in admixture with hydrogen-rich recycle gas through a fixed bed of platinum-containing catalyst at active hydroforming conditions of temperature and pressure, in which the improvement comprises maintaining a dense, fluidized bed of finely divided heat transfer particles in contact with said fixed bed of platinum-containing catalyst, continuously withdrawing heat transfer particles from said fluid bed, heating the withdrawn particles in a separate heating zone, recycling the heated heat transfer particles to the bottom of the dense fluidized bed in order that they may pass concurrently with the reaction mixture through the fixed catalyst bed.

3. A method of hydroforming petroleum fractions boiling within the motor gasoline boiling range by passing said petroleum fractions in preheated condition in admixture with hydrogen-rich recycle gas through a fixed bed of platinum-containing catalyst at active hydroforming conditions of temperature and pressure, in which the improvement comprises maintaining a dense, fluidized bed of finely divided heat transfer particles in contact with said fixed bed of platinum-containing catalyst, continuously withdrawing heat transfer particles from said fluid bed, heating the withdrawn particles in a separate heating zone, recycling the heated heat transfer particles to several levels of the dense fluidized bed in order to maintain the temperature substantially uniform throughout the fixed bed of platinum catalyst.

4. A method of hydroforming petroleum fractions boiling within the motor gasoline boiling range by passing said petroleum fractions in preheated condition in admixture with hydrogen-rich recycle gas through a fixed bed of platinum-containing catalyst at active hydroforming conditions of temperature and pressure, in which the improvement comprises maintaining a dense, fluidized bed of finely divided heat transfer particles in contact with said fixed bed of platinum-containing catalyst, continuously withdrawing heat transfer particles from said fluid bed, heating the withdrawn particles in a separate heating zone, recycling the heated heat transfer particles to the top of the dense fluidized bed in order that they may pass countercurrently to the reaction mixture through the fixed bed of platinum catalyst and establish an inverse temperature gradient in said bed.

5. The method as defined in claim 2 in which the heat transfer particles are heated by indirect heat exchange.

6. The method as defined in claim 2 in which the heat transfer particles are heated by direct heat exchange.

7. The method as defined in claim 3 in which the heat transfer particles are heated by indirect heat exchange.

8. The method as defined in claim 3 in which the heat transfer particles are heated by direct heat exchange.

9. The method as defined in claim 4 in which the heat transfer particles are heated by indirect heat exchange.

10. The method as defined in claim 4 in which the heat transfer particles are heated by direct heat exchange.

11. A method of hydroforming petroleum fractions boiling within the motor gasoline boiling range by passing said petroleum fractions in preheated or vaporized condition in admixture with hydrogen rich recycle gas through a fixed bed of platinum group metal containing catalyst at active hydroforming conditions of temperature and pressure and periodically shutting off the petroleum fraction feed and recycle gas, purging these gases and then supplying an oxygen containing regeneration gas to burn carbon off the catalyst, purging to remove regeneration gases and again passing petroleum feed and recycle gas through said bed at hydroforming conditions, in which the improvement comprises maintaining a dense fluidized bed of heat transfer particles in contact with said fixed bed of catalyst, continuously withdrawing heat transfer particles from said fluid bed, heating the withdrawn particles during the onstream period and cooling the withdrawn particles during the regeneration period in a separate zone, and recycling the heat carrier particles to the dense fluid bed of heat carrier particles in contact with said fixed bed of catalyst.

12. A method of hydroforming petroleum fractions boiling within the motor gasoline boiling range by passing said petroleum fractions in preheated or vaporized condition in admixture with hydrogen rich recycle gas through a fixed bed of platinum group metal containing catalyst at active hydroforming conditions of temperature and pressure and periodically shutting off the petroleum fraction feed and recycle gas, purging these gases and then supplying an oxygen containing regeneration gas to burn carbon off the catalyst, purging to remove regeneration gases and again passing petroleum feed and recycle gas through said bed at hydroforming conditions, in which the improvement comprises maintaining a dense fluidized bed of heat transfer particles in contact with said fixed bed of catalyst, continuously withdrawing heat transfer particles from said fluid bed, heating the withdrawn particles during the onstream period and cooling the withdrawn particles during the regeneration period in a separate zone and recycling the heat carrier particles to the bottom of the dense fluidized bed in order that they may pass concurrently with the reaction mixture through the fixed catalyst bed.

13. A method of hydroforming petroleum fractions boiling within the motor gasoline boiling range by passing said petroleum fractions in preheated or vaporized condition in admixture with hydrogen rich recycle gas through a fixed bed of platinum group metal containing catalyst at active hydroforming conditions of temperature and pressure and periodically shutting off the petroleum fraction feed and recycle gas, purging these gases and then supplying an oxygen containing regeneration gas to burn carbon off the catalyst, purging to remove regeneration gases and again passing petroleum feed and recycle gas through said bed at hydroforming conditions, in which the improvement comprises maintaining a dense fluidized bed of heat transfer particles in contact with said fixed bed of catalyst, continuously withdrawing heat transfer particles from said fluid bed, heating the withdrawn particles during the onstream period and cooling the withdrawn particles during the regeneration period in a separate zone and recycling the heat carrier particles to several levels of the dense fluidized bed in order to maintain the temperature substantially uniform throughout the fixed bed of platinum catalyst.

14. A method of hydroforming petroleum fractions boiling within the motor gasoline boiling range by passing said petroleum fractions in preheated or vaporized condition in admixture with hydrogen rich recycle gas through a fixed bed of platinum group metal containing catalyst at active hydroforming conditions of temperature and pressure and periodically shutting off the petroleum fraction feed and recycle gas, purging these gases and then supplying an oxygen containing regeneration gas to burn carbon off the catalyst, purging to remove regeneration gases and again passing petroleum feed and recycle gas through said bed at hydroforming conditions, in which the improvement comprises maintaining a dense fluidized bed of heat transfer particles in contact with said fixed bed of catalyst, continuously withdrawing heat transfer particles from said fluid bed, heating the withdrawn particles during the onstream period and cooling the withdrawn particles during the regeneration period in a separate zone, and recycling heat carrier particles to the top of the dense fluidized bed in order that they may pass countercurrently to the reaction mixture through the fixed bed of platinum catalyst and thus establish a temperature gradient in said bed.

References Cited in the file of this patent

UNITED STATES PATENTS

| | | |
|---|---|---|
| 2,444,990 | Hemminger | July 13, 1948 |
| 2,479,110 | Haensel | Aug. 16, 1949 |
| 2,602,019 | Odell | July 1, 1952 |
| 2,631,921 | Odell | Mar. 17, 1953 |
| 2,634,232 | Houdry | Apr. 7, 1953 |
| 2,701,230 | Blanding | Feb. 1, 1955 |
| 2,735,743 | Rex | Feb. 21, 1956 |
| 2,749,286 | Hemminger | May 11, 1956 |
| 2,752,407 | Cahn | June 26, 1956 |
| 2,846,364 | Welty | Aug. 5, 1958 |